United States Patent
Lee et al.

(10) Patent No.: US 11,244,143 B2
(45) Date of Patent: Feb. 8, 2022

(54) METHOD AND APPARATUS FOR PREPROCESSING FINGERPRINT IMAGE

(71) Applicant: SAMSUNG ELECTRONICS CO., LTD., Suwon-si (KR)

(72) Inventors: Huijin Lee, Pohang-si (KR); Jingu Heo, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 166 days.

(21) Appl. No.: 16/671,629

(22) Filed: Nov. 1, 2019

(65) Prior Publication Data

US 2020/0184171 A1 Jun. 11, 2020

(30) Foreign Application Priority Data

Dec. 10, 2018 (KR) .................. 10-2018-0158508

(51) Int. Cl.
*G06K 9/00* (2006.01)
*G06K 9/48* (2006.01)
*G06K 9/62* (2006.01)

(52) U.S. Cl.
CPC ............ *G06K 9/001* (2013.01); *G06K 9/482* (2013.01); *G06K 9/6202* (2013.01)

(58) Field of Classification Search
CPC .......... G06K 9/00073; G06K 9/00093; G06K 9/001; G06K 9/0008
See application file for complete search history.

(56) References Cited

U.S. PATENT DOCUMENTS

| 5,915,034 | A | 6/1999 | Nakajima et al. |
| 6,373,970 | B1 | 4/2002 | Dong et al. |
| 6,584,234 | B2 | 6/2003 | Kanamaru et al. |
| 6,839,471 | B1 | 1/2005 | Vogt, IV |
| 6,941,001 | B1* | 9/2005 | Bolle ............ G06F 1/1616 382/115 |
| 7,327,859 | B1* | 2/2008 | Chau ............ G06K 9/00046 382/116 |
| 7,345,365 | B2* | 3/2008 | Lee ............ H01L 21/4857 257/723 |
| 7,545,963 | B2* | 6/2009 | Rowe ............ G06K 9/00033 340/5.53 |

(Continued)

FOREIGN PATENT DOCUMENTS

| KR | 2003-0006789 A | 1/2003 |
| KR | 10-0372297 B1 | 5/2003 |

(Continued)

OTHER PUBLICATIONS

Pakutharivu, P., et al., "Analysis of Fingerprint Image Enhancement Using Gabor Filtering with Different Orientation Field Values", Feb. 2017, Indonesian Journal of Electrical Engineering and Computer Science, vol. 5, No. 2, ISSN: 2502-4752, p. 427-432, 6 pages total.

(Continued)

*Primary Examiner* — Yosef Kassa
(74) *Attorney, Agent, or Firm* — Sughrue Mion, PLLC

(57) ABSTRACT

Provided in a fingerprint image preprocessing method including receiving an input fingerprint image, performing a short-time Fourier transform (STFT) on the input fingerprint image to obtain a transformed fingerprint image, comparing the input fingerprint image and the transformed fingerprint image, and generating a combined image by combining the input fingerprint image and the transformed fingerprint image based on a result of the comparing.

14 Claims, 6 Drawing Sheets

(56) References Cited

U.S. PATENT DOCUMENTS

| | | | | |
|---|---|---|---|---|
| 7,668,350 | B2* | 2/2010 | Rowe | G06K 9/00046 |
| | | | | 382/124 |
| 8,249,314 | B2* | 8/2012 | Bolle | G06K 9/00073 |
| | | | | 382/124 |
| 8,411,913 | B2* | 4/2013 | Zhang | G06K 9/00073 |
| | | | | 382/125 |
| 8,538,096 | B2* | 9/2013 | Bolle | G06K 9/00093 |
| | | | | 382/124 |
| 8,691,575 | B2* | 4/2014 | Toland | G06K 9/00 |
| | | | | 435/410 |
| 9,323,974 | B2* | 4/2016 | Yoshida | H04N 19/635 |
| 9,690,972 | B1* | 6/2017 | Chau | G06K 9/2081 |
| 2017/0083742 | A1 | 3/2017 | Lamare et al. | |

FOREIGN PATENT DOCUMENTS

| | | |
|---|---|---|
| KR | 10-0858681 B1 | 9/2008 |
| KR | 10-2009-0076849 A | 7/2009 |
| KR | 10-0993951 B1 | 11/2010 |
| KR | 10-1180854 B1 | 9/2012 |
| KR | 10-1627062 B1 | 6/2016 |
| KR | 10-2017-0103703 A | 9/2017 |
| KR | 10-2018-0092197 A | 8/2018 |

OTHER PUBLICATIONS

Hong, L, et al., "Fingerprint Image Enhancement: Algorithm and Performance Evaluation", Aug. 1998, IEEE Transactions on Pattern Analysis and Machine Intelligence, vol. 20, No. 8, p. 777-789, 13 pages total.

Sherlock, B. G., et al., "Fingerprint enhancement by directional Fourier filtering", Apr. 1994, IEE Proc.-Vis. Image Signal Process., vol. 141, No. 2, p. 87-94, 8 pages total.

Chikkerur, S., et al., "Fingerprint Image Enhancement Using STFT Analysis", 2005, ICAPR 2005, LNCS 3687, p. 20-29, 10 pages total.

* cited by examiner

METHOD AND APPARATUS FOR PREPROCESSING FINGERPRINT IMAGE

CROSS-REFERENCE TO RELATED APPLICATION

This application claims priority from Korean Patent Application No. 10-2018-0158508 filed on Dec. 10, 2018 in the Korean Intellectual Property Office, the disclosure of which is incorporated herein by reference in its entirety.

BACKGROUND

1. Field

Example embodiments of the present disclosure relate to fingerprint verification. More particularly, example embodiments relate to a method of preprocessing a fingerprint image in a fingerprint verification process to improve a quality of the fingerprint image.

2. Description of Related Art

Biometric authentication is used to authenticate a user by using the user's biological features, such as, fingerprints, irises, voice, facial features, blood vessels, and the like. Such biological features used in user authentication vary from person to person and rarely change during the lifetime of a user. Further, the biological features pose a low risk of theft or imitation, providing high-security authentication. Unlike fobs and other external objects, individuals do not need to exert any efforts to carry around such features at all times and may thus not suffer any inconvenience in using the biological features. As one way of the biometric authentication, fingerprint verification approaches are most commonly used due to their high level of convenience, security, and economic efficiency. One of these approaches may include comparing a fingerprint image of a user requesting user authentication to a previously registered fingerprint image, and determining whether to authenticate the user based on a result of the comparing.

Such fingerprint verification approach is most generally used for biometric authentication, and the need for achieving a high level of performance in fingerprint verification is thus on a steady rise. A quality of a fingerprint image may be degraded due to a poor fingerprint condition, for example, a dry or wet fingerprint, a restriction of a fingerprint sensor, and other causes. The degraded quality may be a main cause of degraded performance in fingerprint verification. There is a need to improve the quality of a fingerprint image to achieve a high level of performance in verification.

SUMMARY

According to an aspect of an example embodiment, there is provided a fingerprint image preprocessing method including receiving an input fingerprint image, performing a short-time Fourier transform (STFT) on the input fingerprint image to obtain a transformed fingerprint image, comparing the input fingerprint image and the transformed fingerprint image, and generating a combined image by combining the input fingerprint image and the transformed fingerprint image based on a result of the comparing.

The generating of the combined image may include separating a phase and a magnitude from each of the input fingerprint image and the transformed fingerprint image, and applying a result of combining the phase and the magnitude of the input fingerprint image and the magnitude of the transformed fingerprint image to each area of the combined image, or applying the transformed fingerprint image to each area of the combined image.

The comparing may further include comparing a sensitivity of the input fingerprint image and a sensitivity of the transformed fingerprint image for each corresponding area.

The comparing may further include setting a mask in each of the input fingerprint image and the transformed fingerprint image, and comparing each of a plurality of pixels in an area in the input fingerprint image corresponding to the mask and each of a plurality of pixels in an area in the transformed fingerprint image corresponding to the mask.

The comparing of each of the plurality of pixels may include comparing a pixel value of a pixel in the area in the input fingerprint image and a pixel value of a pixel in the area in the transformed fingerprint image.

The comparing of each of the plurality of pixels may include in response to a pixel value of a first pixel in the area in the input fingerprint image being greater than a pixel value of a second pixel corresponding to a position of the first pixel in the area in the transformed fingerprint image, allocating a first identifier to a corresponding position of the first pixel in the combined image, and in response to the pixel value of the first pixel in the area in the input fingerprint image being less than the pixel value of the second pixel corresponding to the position of the first pixel in the area in the transformed fingerprint image, allocating a second identifier to the corresponding position of the first pixel in the combined image.

The generating of the combined image may include in response to the sensitivity of the input fingerprint image being greater than the sensitivity of the transformed fingerprint image, combining the input fingerprint image and the transformed fingerprint image, and applying a result of the combining to generate the combined image.

The generating of the combined image may include in response to a pixel value of a first pixel in the area in the input fingerprint image being greater than a pixel value of a second pixel corresponding to a position of the first pixel in the area in the transformed fingerprint image, applying, to a corresponding position of the first pixel in the combined image, a result of combining the input fingerprint image and the transformed fingerprint image.

The generating of the combined image may include applying, to the corresponding position of the first pixel in the combined image, a result of combining the input fingerprint image and the transformed fingerprint image based on the first identifier, and applying, to the corresponding position of the first pixel in the combined image, the transformed fingerprint image based on the second identifier.

A non-transitory computer-readable storage medium storing instructions that, when executed by a processor, may cause the processor to perform the fingerprint image preprocessing method.

According to an aspect of an example embodiment, there is provided a fingerprint image preprocessing apparatus including at least one processor, and a memory configured to store an instruction to operate the processor, wherein the processor is configured to receive an input fingerprint image, perform a short-time Fourier transform (STFT) on the input fingerprint image to obtain a transformed fingerprint image, compare the input fingerprint image and the transformed fingerprint image, and generate a combined image by combining the input fingerprint image and the transformed fingerprint image based on a result of the comparing.

The processor may be further configured to separate a phase and a magnitude from each of the input fingerprint image and the transformed fingerprint image, and apply an image resulting from of combining the phase and the magnitude of the input fingerprint image and the magnitude of the transformed fingerprint image to each area of the combined image, or apply the transformed fingerprint image to each area of the combined image.

The processor may be further configured to set a mask in each of the input fingerprint image and the transformed fingerprint image, and compare each of a plurality of pixels in an area in the input fingerprint image corresponding to the mask and each of a plurality of pixels in an area in the transformed fingerprint image corresponding to the mask.

The processor may be further configured to compare a pixel value of a pixel in the area in the input fingerprint image and a pixel value of a pixel in the area in the transformed fingerprint image.

The processor may be further configured to in response to a pixel value of a first pixel in an area in the input fingerprint image being greater than a pixel value of a second pixel corresponding to a position of the first pixel in an area in the transformed fingerprint image, allocate a first identifier to a corresponding position of the first pixel in the combined image, and in response to the pixel value of the first pixel in the area in the input fingerprint image being less than the pixel value of the second pixel corresponding to the position of the first pixel in the area in the transformed fingerprint image, allocate a second identifier to the corresponding position of the first pixel in the combined image.

The processor may be further configured to apply, to the corresponding position of the first pixel in the combined image, a result of combining the input fingerprint image and the transformed fingerprint image based on the first identifier, and apply, to the corresponding position of the first pixel in the combined image, the transformed fingerprint image based on the second identifier.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
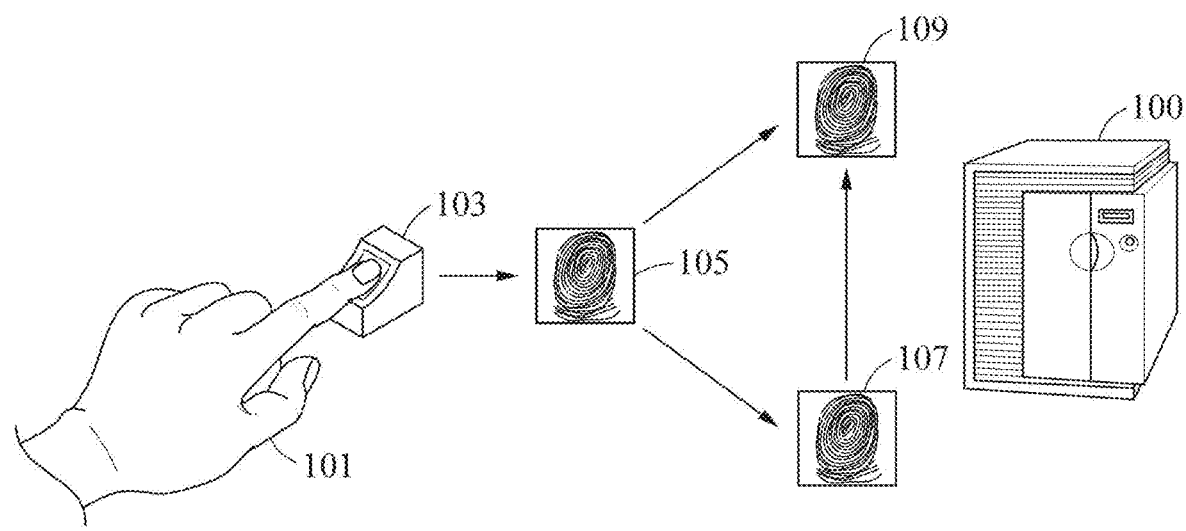
FIG. 1 is a diagram illustrating an example of how a fingerprint is recognized by a fingerprint image preprocessing apparatus according to an example embodiment.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the present disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the example embodiments of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 is a diagram illustrating an example of how a fingerprint is recognized by a fingerprint image preprocessing apparatus according to an example embodiment. A fingerprint image preprocessing apparatus may be an apparatus for preprocessing a fingerprint image, and a fingerprint image preprocessing method may be a method of preprocessing a fingerprint image.

Referring to FIG. 1, a fingerprint image preprocessing apparatus 100 obtains a transformed fingerprint image 107 by preprocessing an input fingerprint image 105 of a user 101, and compares the input fingerprint image 105 and the transformed fingerprint image 107. The fingerprint image preprocessing apparatus 100 combines the input fingerprint image 105 and the transformed fingerprint image 107 by selecting an image with a higher sensitivity between the input fingerprint image 105 and the transformed fingerprint image 107 for each corresponding area, and generates a combined image 109. The combined image 109 is then used to extract feature points to be used for fingerprint verification.

The fingerprint verification may be a verification method used to determine whether the user 101 attempting at such verification is a valid user or not, and verify a valid user in applications, such as, for example, user log-in, payment services, financial services, and access control. Referring to FIG. 1, a fingerprint verification apparatus that performs such a verification method includes the fingerprint image preprocessing apparatus 100, and is included in, or represented by, a computing apparatus. The computing apparatus may include various types of products such as, for example, a smart phone, a wearable device, a personal computer (PC), a tablet PC or simply tablet, a desktop, a laptop, a notebook, a personal digital assistant (PDA), a set-top box, a home appliance, a biometrics-based door lock, a security device, a smart vehicle, and others capable of wireless communication or network communication consistent with that disclosed herein.

A fingerprint includes ridges and valleys. A ridge indicates a convex portion of protruding pores, and a valley indicates a relatively concave portion between ridges. A point at which a ridge ends is referred to as an ending point, and a point at which a ridge is bifurcated is referred to as a bifurcation point. A ridge includes a beginning and an end of the ridge, a bifurcation, a core, and a delta. The core indicates an end portion of a rotation of a ridge, and the delta indicates a point at which flows of ridges converge in three directions. These are also finely classified into a dot, a right ending, an island or isolated portion, a bridge, a short ridge, and the like, which are collectively referred to as minutiae. Each of the elements included in a fingerprint described above is also individually referred to as a feature.

As illustrated, the computing apparatus determines whether the user 101 attempting to have access to the computing apparatus is a valid user or not by analyzing a fingerprint pattern of the input fingerprint image 105 sensed through a fingerprint sensor 103. For example, when the user 101 inputs a fingerprint of the user 101 to unlock the computing apparatus, the computing apparatus may compare the input fingerprint image 105 obtained from the input fingerprint through the fingerprint sensor 103 to at least one registered fingerprint images stored in a database (DB), and determine whether to unlock the computing apparatus based on a result of the comparing. The DB may include therein registered fingerprint images of one or more fingers.

For example, a valid user may register fingerprint information of the valid user in advance in the computing apparatus, and the computing apparatus may store the registered fingerprint information in the DB or a cloud storage. The registered fingerprint information may be stored in a form of registered fingerprint image. In a fingerprint registration process, a user may register various fingerprint images.

Before extracting a feature point from an input fingerprint image, the computing apparatus may preprocess the input fingerprint image to more effectively extract the feature point. The computing apparatus may extract the feature point from a fingerprint image transformed through the preprocessing. The computing apparatus may then compare the feature point of the input fingerprint image obtained through a fingerprint sensor and each of feature points of previously registered fingerprint images.

However, the fingerprint image transformed through the preprocessing may not include a feature point that is sufficient to identify a fingerprint. When fingerprint verification is performed by comparing the transformed fingerprint image with such an insufficient feature point and a registered fingerprint image one to one, an undesirable result such as false acceptance may occur. For example, when the fingerprint image transformed through the preprocessing does not sufficiently reflect the feature point included in the input fingerprint image, a similarity between the input fingerprint image and a registered fingerprint image may be set to be high due to a simple fingerprint pattern and such a result of false acceptance may be highly likely to occur.

The false acceptance in fingerprint verification may adversely affect accuracy in the fingerprint verification or a recognition rate of the fingerprint verification, and it is thus desirable to prevent such an occurrence of the false acceptance. Thus, example embodiments described herein provide a preprocessing method used to more effectively extract a feature point from a fingerprint image while preventing the false acceptance.

According to an example embodiment, the fingerprint image preprocessing apparatus 100 uses both the input fingerprint image 105 and the transformed fingerprint image 107, and thus applies a feature of such an original image and a feature emphasized by the preprocessing to the combined image 109. Thus, the fingerprint image preprocessing apparatus 100 may obtain an image including a feature point more sufficient for fingerprint verification, and the fingerprint verification may be more accurately performed.

The fingerprint image preprocessing apparatus 100 preprocesses the input fingerprint image 105 using a short-time Fourier transform (STFT) along with frequency-domain magnitude and phase features. The fingerprint image preprocessing apparatus 100 may thus obtain a more effective preprocessed image by combining a feature of a fingerprint image transformed through the STFT and the frequency-domain magnitude and phase features. The fingerprint image preprocessing apparatus 100 may combine a fingerprint image in which a main pattern is emphasized by the STFT and a fingerprint image in which an auxiliary pattern is emphasized by a frequency-domain magnitude and phase analysis. To the combined image 109, both the main pattern and the auxiliary pattern may be applied. The main pattern may indicate an overall feature or shape of a fingerprint formed by ridges and valleys, and the auxiliary pattern may indicate all other patterns of the fingerprint excluding the main pattern. The auxiliary pattern may include, for example, an edge and a line of a ridge. The auxiliary pattern may also be referred to as a subpattern or a small pattern.

In a fingerprint image transformed through the STFT, a ridge and a valley of a fingerprint may be clearer, and other features may be blurred or omitted. That is, an auxiliary pattern of a fingerprint may be blurred or omitted. The fingerprint image preprocessing apparatus 100 may thus obtain a main pattern indicating ridges and valleys from the transformed fingerprint image 107 obtained through the STFT, and obtain an auxiliary pattern of the ridges from the input fingerprint image 105. To this end, the fingerprint image preprocessing apparatus 100 may separate a frequency magnitude component and a frequency phase component from each of the input fingerprint image 105 and the transformed fingerprint image 107 obtained through the STFT.

The fingerprint image preprocessing apparatus 100 may separate a magnitude and a phase of each of the input fingerprint image 105 and the transformed fingerprint image 107 using a fingerprint transformation such as, for example, Fourier transform. A two-dimensional (2D) Fourier transform and frequency-domain magnitude and phase features are as follows. A Fourier transform refers to a method of analyzing an image in terms of frequency, and indicates which frequency components the image consists of. Equation 1 represents how a 2D image f(x, y) is transformed into a frequency domain through the Fourier transform.

$$F(u,v) = \int_{-\infty}^{\infty} \int_{-\infty}^{\infty} f(x,y) e^{-j2\pi(ux+vy)} dx dy \qquad [\text{Equation 1}]$$

In Equation 1, F(u, v) is represented by a complex number as in Equation 2, and a magnitude and a phase in the frequency domain are represented by Equation 3.

$$F(u,v) = F_R(u,v) + jF_I(u,v) \qquad [\text{Equation 2}]$$

magnitude $|F(u,v)|$ phase $\arctan(F_I(u,v)/F_R(u,v))$ [Equation 3]

In an image transformed through the Fourier transform, a phase may shift basic waveforms and may have a same value at edges and lines according to a principle of phase congruency. Herein, a same phase value at the edges or lines may indicate that various frequency waveforms may overlap at a corresponding position. A phase in the frequency domain may be closely related to an edge or line. A magnitude in the frequency domain may indicate a signal strength at a corresponding frequency. A frequency magnitude in an image may affect an overall feature of the image excluding an edge or line. Thus, when changing magnitude components in the frequency domain, such an overall feature such as a texture of the image may also change.

The fingerprint image preprocessing apparatus 100 may generate the combined image 190 by combining the separated phase and magnitude. The fingerprint image preprocessing apparatus 100 may obtain a relatively clear texture from the transformed fingerprint image 107, and obtain an auxiliary pattern such as an edge and line from the input fingerprint image 105. The fingerprint image preprocessing apparatus 100 may use the transformed fingerprint image 107 as a basic image. However, when there is an insufficient feature of the transformed fingerprint image 107, the fingerprint image preprocessing apparatus 100 may use the input fingerprint image 105 to generate the combined image 109.

When using the transformed fingerprint image 107 obtained through the STFT, the auxiliary pattern may be blurred or omitted although the main pattern may be reflected in the transformed fingerprint image 107. Thus, the fingerprint image preprocessing apparatus 100 may use the input fingerprint image 105 for an area in which the auxiliary pattern is blurred or omitted by comparing the transformed fingerprint image 107 and the input fingerprint image 105. For example, the fingerprint image preprocessing apparatus 100 may determine whether to use the transformed fingerprint image 107 or the input fingerprint image 105 based on Equation 4.

$A_{mag}$ $B_{mag}$ $M_{mag}$ $m_{i,j} = 1 (b_{i,j} - a_{i,j} < 0)$ $m_{i,j} = 0 (b_{i,j} - a_{i,j} > 0)$ [Equation 4]

Referring to Equation 4, the fingerprint image preprocessing apparatus 100 sets a mask $M_{mag}$ of a matrix, m*n. Herein, the mask may be used to specify an area in an image. In Equation 4, $A_{mag}$ denotes a magnitude component of the input fingerprint image 105 in the matrix m*n, and $B_{mag}$ denotes a magnitude component of the transformed fingerprint image 107 in the matrix m*n. The fingerprint image preprocessing apparatus 100 obtains each pixel value $a_{i,j}$ in the mask by applying the mask to the input fingerprint image 105, and obtains each pixel value $b_{i,j}$ in the mask by applying the mask to the transformed fingerprint image 107.

The fingerprint image preprocessing apparatus 100 then compares the value $a_{i,j}$ and the value $b_{i,j}$. In response to the value $a_{i,j}$ being greater than the value $b_{i,j}$, the fingerprint image preprocessing apparatus 100 determines that the transformed fingerprint image 107 does not include the auxiliary pattern included in the input fingerprint image 105. The fingerprint image preprocessing apparatus 100 allocates 1 to a mask value $m_{i,j}$ at a position (i, j) corresponding to the value $a_{i,j}$ and the value $b_{i,j}$. The value 1 to be allocated may be used for identification, and thus other different values may also be allocated.

Conversely, in response to the value $a_{i,j}$ being less than the value $b_{i,j}$, the fingerprint image preprocessing apparatus 100 determines that the transformed fingerprint image 107 includes the auxiliary pattern included in the input fingerprint image 105. The fingerprint image preprocessing apparatus 100 allocates 0 to the mask value $m_{i,j}$ at the position (i, j) corresponding to the value $a_{i,j}$ and the value $b_{i,j}$. The value 0 to be allocated may be used for identification, and thus other different values may also be allocated.

When the mask value $m_{i,j}$ corresponding to a pixel at the position (i, j) is 0, the fingerprint image preprocessing apparatus 100 may select a value of the transformed fingerprint image 107. When the mask value $m_{i,j}$ corresponding to the pixel at the position (i, j) is 1, the fingerprint image preprocessing apparatus 100 may combine a component of the transformed fingerprint image 105 and a component of the input fingerprint image 105 and apply a result of the combining to generate the combined image 109. For example, the fingerprint image preprocessing apparatus 100 may combine the components of the transformed fingerprint image 107 and the input fingerprint image 105 using Equation 5.

$$F(u,v) = B'_{mag}(u,v) * \exp(-j * A_{phase}(u,v)) \qquad [\text{Equation 5}]$$

In Equation 5, $A_{phase}$ denotes a phase component of the input fingerprint image 105 which is an original image, and $B'_{mag}$ denotes a magnitude component obtained by combining the magnitude component of the input fingerprint image 105 and the magnitude component of the transformed fingerprint image 107.

The fingerprint image preprocessing apparatus 100 obtains a final image through an inverse Fourier transform (IFT). For example, the fingerprint image preprocessing apparatus 100 may obtain the final image using Equation 6.

$$f(x,y) = \int_{-\infty}^{\infty} \int_{-\infty}^{\infty} F(u,v) e^{j2\pi(ux+vy)} du dv \qquad [\text{Equation 6}]$$

The final image may have the auxiliary pattern while maintaining a clear feature obtained through the STFT, and may thus be more natural fingerprint image than the transformed fingerprint image 107 obtained through the STFT.

Figure 2:
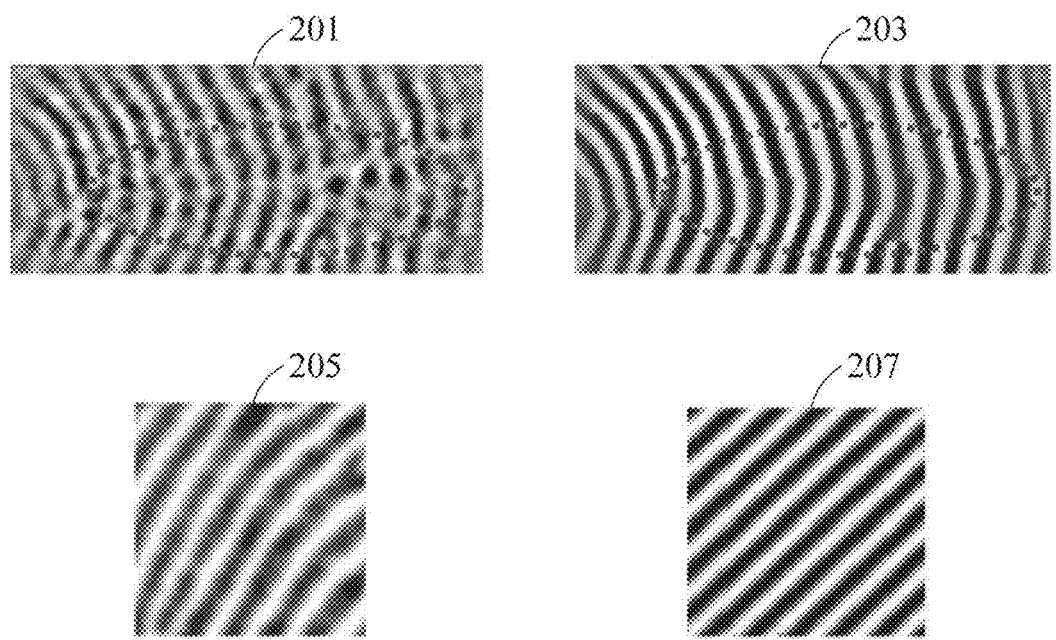
FIG. 2 is a diagram illustrating an example of how an input fingerprint image is transformed into a fingerprint image through a short-time Fourier transform (STFT) according to an example embodiment.

FIG. 2 is a diagram illustrating an example of how an input fingerprint image is transformed into a fingerprint image through a STFT according to an example embodiment.

There are various methods to improve an image quality of a fingerprint image. Among these, a generally used method is estimating a frequency and an orientation of a local ridge of a fingerprint from a spatial domain or a frequency domain, and applying a contextual filter based on the estimated frequency and orientation. For example, the method may include estimating a frequency and an orientation of a local fingerprint ridge in a frequency domain through an STFT and applying a contextual filter based on the estimated frequency and orientation to improve an image quality of a fingerprint image.

Referring to FIG. 2, an input fingerprint image 201 is an original image formed by a sensor. The input fingerprint image 201 includes a main pattern formed by ridges and valleys of a fingerprint and an auxiliary pattern including edges and lines of the ridges. In the input fingerprint image 201, an area indicated by a broken line includes a disconnected portion. A ridge includes a component other than a sinusoidal wave, and thus an area 205 of the input fingerprint image 201 may have a complex feature.

In a transformed fingerprint image 203 obtained through an STFT, the main pattern formed by the ridges and the valleys is emphasized, whereas the auxiliary pattern is blurred or omitted. In the transformed fingerprint image 203, an area indicated by a broken line includes a disconnected portion. The STFT may be performed to estimate a frequency and an orientation under an assumption that a ridge corresponds to a single specific sinusoidal wave, and thus the main pattern of the ridges may be emphasized as illustrated in an area 207 of the transformed fingerprint image 203 and the auxiliary pattern in the area 205 of the input fingerprint image 201 may be blurred or omitted in the area 207 of the transformed fingerprint image 203.

Figure 3:
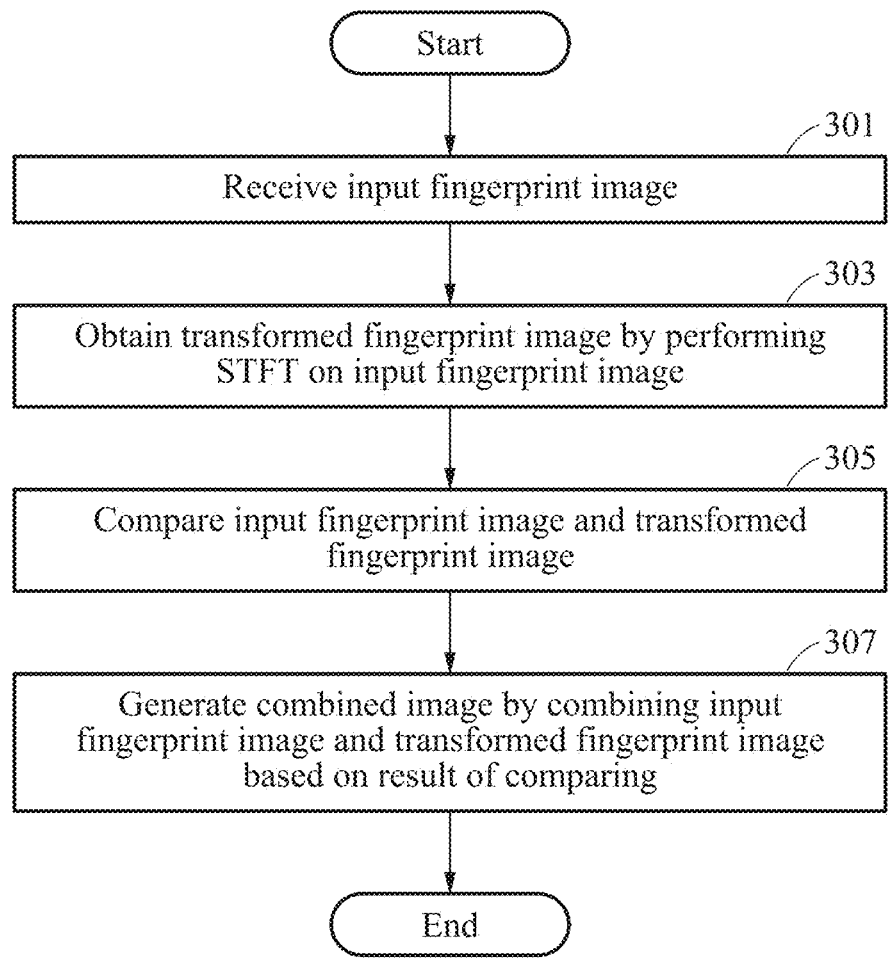
FIG. 3 is a flowchart illustrating an example of a fingerprint image preprocessing method according to an example embodiment.

FIG. 3 is a flowchart illustrating an example of a fingerprint image preprocessing method according to an example embodiment.

Referring to FIG. 3, in operation 301, a fingerprint image preprocessing apparatus receives an input fingerprint image. The fingerprint image preprocessing apparatus may receive the input fingerprint image corresponding to an original image from a sensor. The input fingerprint image may include both a feature of a main pattern and a feature of an auxiliary pattern.

In operation 303, the fingerprint image preprocessing apparatus obtains a transformed fingerprint image by performing an STFT on the input fingerprint image. The transformed fingerprint image may include a main pattern that is clearer than that in the input fingerprint image. In the transformed fingerprint image, the auxiliary pattern included in the input fingerprint image may be blurred or omitted.

In operation 305, the fingerprint image preprocessing apparatus compares the input fingerprint image and the transformed fingerprint image. The fingerprint image preprocessing apparatus may compare a sensitivity of the input fingerprint image and a sensitivity of the transformed fingerprint image in each corresponding area. Herein, the sensitivity may indicate how well features included in the original image are reflected. For example, when an image includes an auxiliary pattern, the image may be determined to have a higher sensitivity compared to an image from which such an auxiliary pattern is omitted.

The fingerprint image preprocessing apparatus may set a mask in each of the input fingerprint image and the transformed fingerprint image. The fingerprint image preprocessing apparatus may compare each of pixels in an area in the input fingerprint image corresponding to the mask and each of pixels in an area in the transformed fingerprint image corresponding to the mask. The fingerprint image preprocessing apparatus may compare a pixel value of a pixel included in the area in the input fingerprint image and a pixel value of a pixel included in the corresponding area in the transformed fingerprint image.

For example, when a pixel value of a first pixel included in the area in the input fingerprint image is greater than a pixel value of a second pixel corresponding to a position of the first pixel in the area in the transformed fingerprint image, the fingerprint image preprocessing apparatus may allocate a first identifier to a corresponding position of the first pixel in the combined image. In this example, the first identifier may be 1.

Conversely, when the pixel value of the first pixel included in the area in the input fingerprint image is less than the pixel value of the second pixel included in the area in the transformed fingerprint image, the fingerprint image preprocessing apparatus may allocate a second identifier to the corresponding position of the first pixel in the combined image. In this example, the second identifier may be 0.

In operation 307, the fingerprint image preprocessing apparatus generates the combined image by combining the input fingerprint image and the transformed fingerprint image based on a result of the comparing. The fingerprint image preprocessing apparatus may separate a phase and a magnitude of the input fingerprint image, and a phase and a magnitude of the transformed fingerprint image. The fingerprint image preprocessing apparatus may use a Fourier transform for the separating of a phase and a magnitude.

The fingerprint image preprocessing apparatus may apply a result of combining the phase and the magnitude of the input fingerprint image and the magnitude of the transformed fingerprint image to each area of the combined image, or apply the transformed fingerprint image to each area of the combined image, based on a result of the comparing. Herein, when a sensitivity of the input fingerprint image is greater than a sensitivity of the transformed fingerprint image, the fingerprint image preprocessing apparatus may combine the input fingerprint image and the transformed fingerprint image and apply a result of the combining to generate the combined image.

For example, when the pixel value of the first pixel included in the area in the input fingerprint image is greater than the pixel value of the second pixel corresponding to the position of the first pixel in the area in the transformed fingerprint image, the fingerprint image preprocessing apparatus may apply a result of combining the input fingerprint image and the transformed fingerprint image to the corresponding position of the first pixel in the combined image.

The fingerprint image preprocessing apparatus may apply, to the corresponding position of the first pixel in the combined image, a result of combining the input fingerprint image and the transformed fingerprint image based on the first identifier. In addition, the fingerprint image preprocessing apparatus may apply, to the corresponding position of the first pixel in the combined image, the transformed fingerprint image based on the second identifier.

Figure 4:
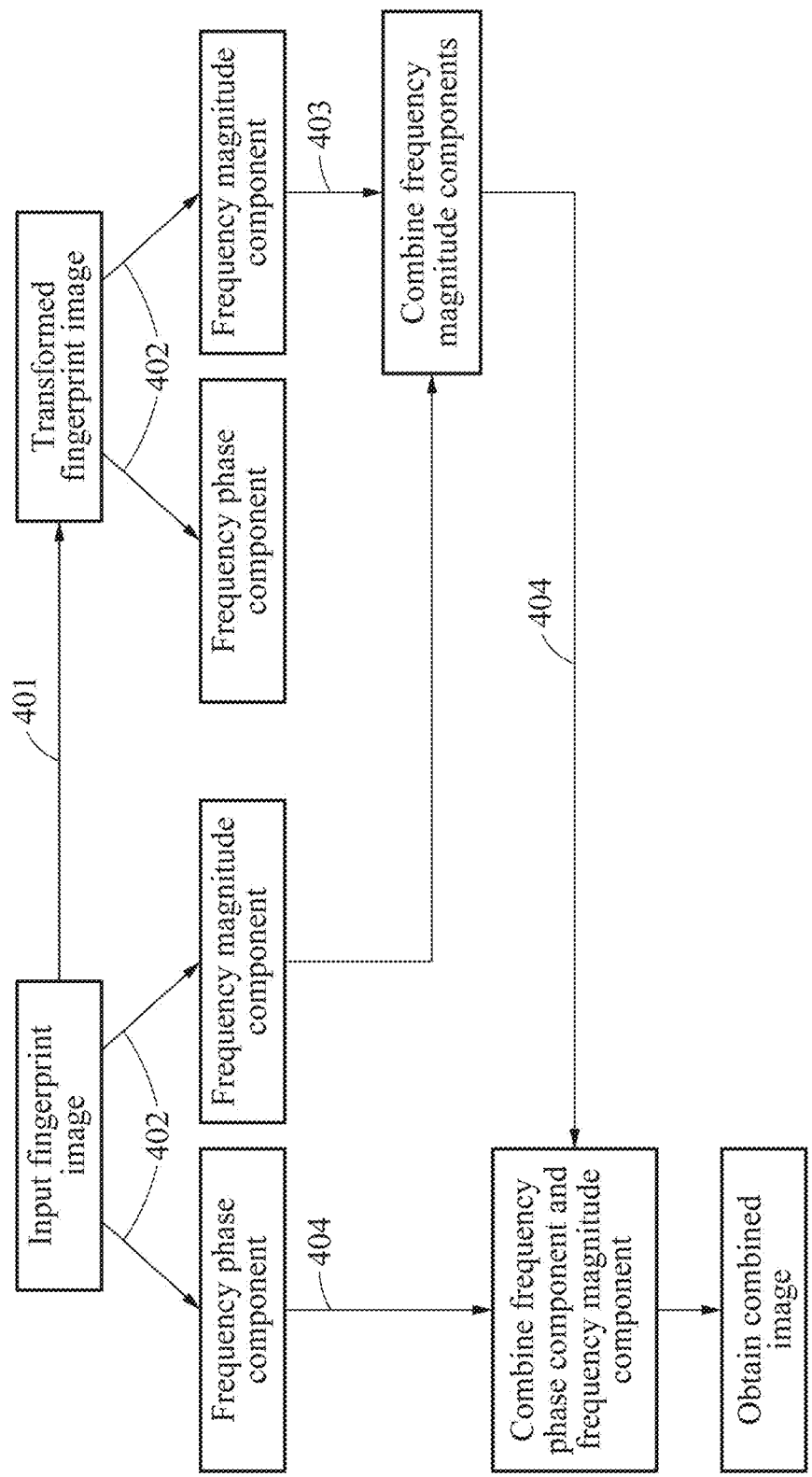
FIG. 4 is a diagram illustrating an example of an overall operation of a fingerprint image preprocessing method according to an example embodiment.

FIG. 4 is a diagram illustrating an example of an overall operation of a fingerprint image preprocessing method according to an example embodiment.

Referring to FIG. 4, in operation 401, a fingerprint image preprocessing apparatus obtains a transformed fingerprint image by performing an STFT on an input fingerprint image.

In operation 402, the fingerprint image preprocessing apparatus separates a frequency phase component and a frequency magnitude component from each of the input fingerprint image and the transformed fingerprint image. For example, the fingerprint image preprocessing apparatus may apply a Fourier transform to separate the frequency phase component and the frequency magnitude component from each of the input fingerprint image and the transformed fingerprint image.

The fingerprint image preprocessing apparatus may select a component to be applied to a combined image by comparing the input fingerprint image and the transformed fingerprint image. The fingerprint image preprocessing apparatus may basically select the transformed fingerprint image for each area of the combined image. However, when a feature included in the input fingerprint image is not included in the transformed fingerprint image, the fingerprint image preprocessing apparatus may apply a component of the input fingerprint image to a corresponding area of the combined image.

When the feature included in the input fingerprint image is not included in the transformed fingerprint image, the fingerprint image preprocessing apparatus performs operations 403 and 404. In operation 403, the fingerprint image preprocessing apparatus combines the frequency magnitude component of the input fingerprint image and the frequency magnitude component of the transformed fingerprint image. In operation 404, the fingerprint image preprocessing apparatus combines the combined frequency magnitude component and the frequency phase component of the input fingerprint image.

These operations described above may be performed on each of all areas of the input fingerprint image, and thus the combined image may be obtained. The combined image, which is a final image, may include an auxiliary pattern while maintaining a clearer feature through the STFT, and thus may be a more natural fingerprint image than the transformed fingerprint image itself obtained through the STFT.

Figure 5:
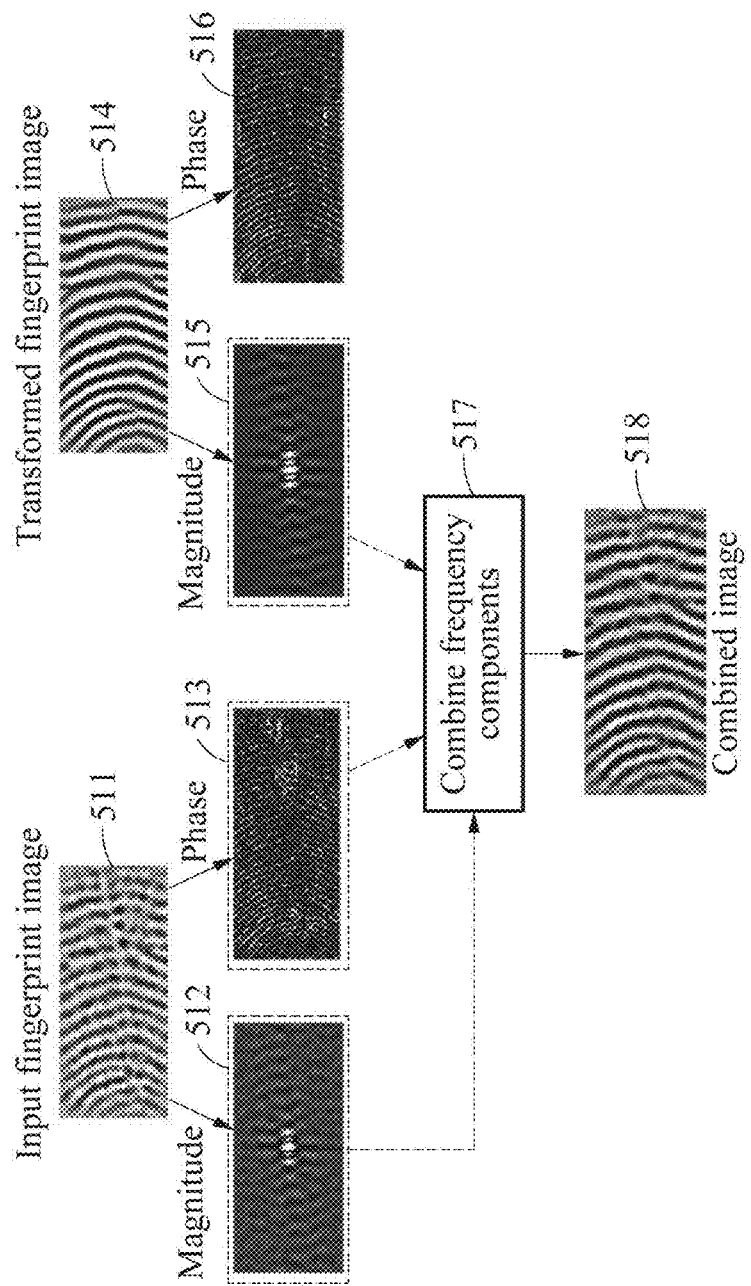
FIG. 5 is a diagram illustrating an example of how a combined image is generated from an input fingerprint image through a fingerprint image preprocessing method according to an example embodiment.

FIG. 5 is a diagram illustrating an example of how a combined image is generated from an input fingerprint image through a fingerprint image preprocessing method according to an example embodiment.

Referring to FIG. 5, an input fingerprint image 511 which is an original image obtained from a sensor includes a main pattern formed by ridges and valleys, and an auxiliary pattern including edges and lines of the ridges. For example, the input fingerprint image 511 may include, as the auxiliary pattern, an area in which ridges are disconnected.

A transformed fingerprint image 514 obtained through an STFT includes the main pattern that is more emphasized compared to the main pattern in the input fingerprint image 511. The auxiliary pattern may be blurred or omitted in the transformed fingerprint image 514. For example, the area of the input fingerprint image 511 in which the ridges are disconnected may be omitted in the transformed fingerprint image 514. As described above, the main pattern may be more emphasized in the transformed fingerprint image 514, whereas the auxiliary pattern included in the input fingerprint image 511 may be blurred or omitted in the transformed fingerprint image 514.

A fingerprint image preprocessing apparatus may compare a sensitivity of the input fingerprint image 511 and a sensitivity of the transformed fingerprint image 514 for each corresponding area. For example, for an area corresponding to the area in which the ridges are disconnected, the fingerprint image preprocessing apparatus may determine that the transformed fingerprint image 514 does not include the auxiliary pattern of the input fingerprint image 511 in which the ridges are disconnected. The fingerprint image preprocessing apparatus may then apply the auxiliary pattern of the input fingerprint image 511 to a corresponding area in the transformed fingerprint image 514.

To this end, the fingerprint image preprocessing apparatus may separate a magnitude and a phase of the input fingerprint image 511, and a magnitude and a phase of the transformed fingerprint image 514. For example, as illustrated, the fingerprint image preprocessing apparatus separates a magnitude 512 of the input fingerprint image 511 and a phase 513 of the input fingerprint image 511, and a magnitude 515 of the transformed fingerprint image 514 and a phase 516 of the transformed fingerprint image 514.

In operation 517, the fingerprint image preprocessing apparatus combines or synthesizes frequency components using the magnitude 512 and the phase 513 of the input fingerprint image 511, and the magnitude 515 of the transformed fingerprint image 514. The fingerprint image preprocessing apparatus generates a magnitude component by combining the magnitude 512 of the input fingerprint image 511 and the magnitude 515 of the transformed fingerprint image 514, and uses the phase 513 of the input fingerprint image 511 as a phase component. The fingerprint image preprocessing apparatus obtains a frequency component of a combined image 518 using the generated magnitude component and the phase component. By performing the above operations on all the areas of the input fingerprint image 511 and the transformed fingerprint image 514, the fingerprint image preprocessing apparatus obtains the combined image 518.

Figure 6:
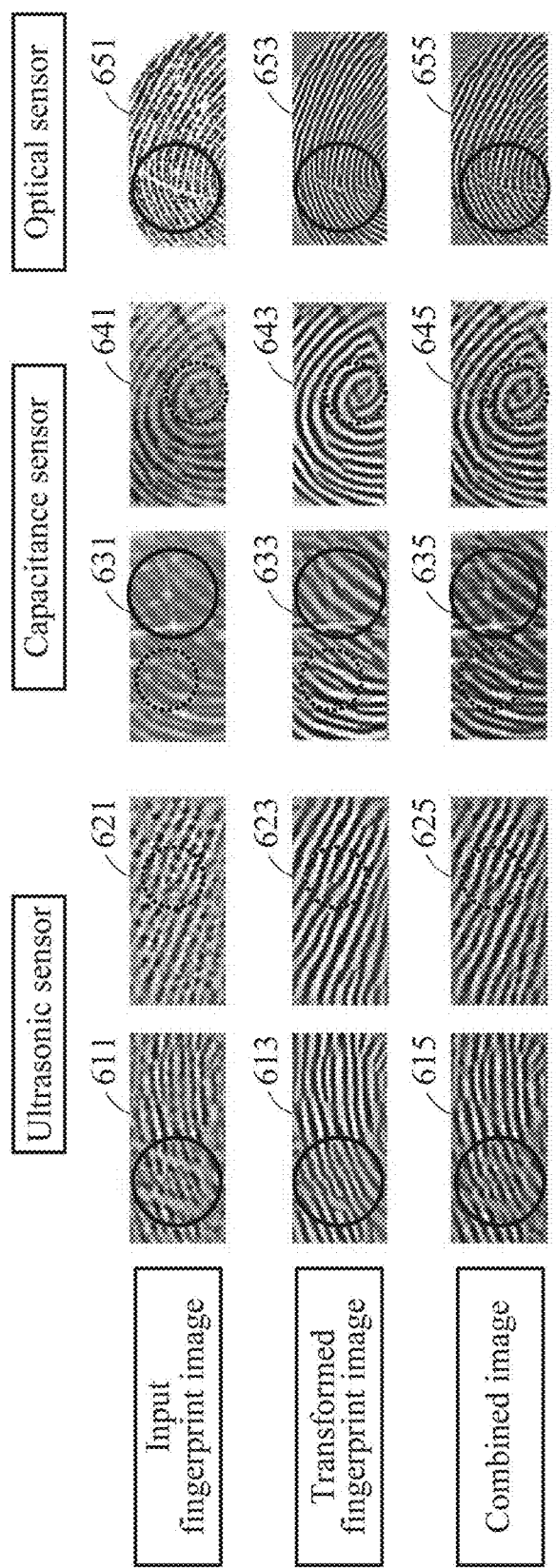
FIG. 6 is a diagram illustrating an example of how a combined image is obtained from fingerprint images input from various sensors according to an example embodiment.

FIG. 6 is a diagram illustrating an example of how a combined image is obtained from fingerprint images input from various sensors according to an example embodiment.

A fingerprint image preprocessing apparatus may perform an STFT on input fingerprint images which are original images received from various sensors, and obtain respective combined images. In the example illustrated in FIG. 6, a solid-line circle in each image is an indication used for the comparison in terms of how well an auxiliary pattern is represented in each image, and a broken-line circle in each image is an indication used for the comparison in terms of how natural each image is as compared to a corresponding original image.

Referring to FIG. 6, a fingerprint image 613 transformed from an input fingerprint image 611 obtained from an ultrasonic sensor does not desirably include therein an auxiliary pattern included in the input fingerprint image 611. For example, as illustrated, an area in which ridges are disconnected is not included in the transformed fingerprint image 613. However, the auxiliary pattern included in the input fingerprint image 611 is included in a combined image 615 obtained by the fingerprint image preprocessing apparatus.

A fingerprint image 623 transformed from an input fingerprint image 621 obtained from the ultrasonic sensor may be less natural because it does not include therein an auxiliary pattern included in the input fingerprint image 621 although it includes clearer ridges. However, the auxiliary pattern included in the input fingerprint image 621 is included in a combined image 625 obtained by the fingerprint image preprocessing apparatus, and thus the combined image 625 may represent a more natural result.

A fingerprint image 633 transformed from an input fingerprint image 631 obtained from a capacitance sensor does not desirably include therein an auxiliary pattern included in the input fingerprint image 631. For example, as illustrated, a white auxiliary pattern disconnecting ridges is not included in the transformed fingerprint image 633. However, the auxiliary pattern included in the input fingerprint image 631 is included in a combined image 635 obtained by the fingerprint image preprocessing apparatus.

A fingerprint image 643 transformed from an input fingerprint image 641 obtained from the capacitance sensor may be less natural because it does not include therein an auxiliary pattern included in the input fingerprint image 641 although it includes clearer ridges and a clearer core. However, the auxiliary pattern included in the input fingerprint image 641 is included in a combined image 645 obtained by the fingerprint image preprocessing apparatus, and thus the combined image 645 may represent a more natural result.

A fingerprint image 653 transformed from an input fingerprint image 651 obtained from an optical sensor may not include an auxiliary pattern included in the input fingerprint image 651. For example, a length of an area in which ridges are disconnected is represented shorter in the transformed fingerprint image 653 than the input fingerprint image 651. However, the auxiliary pattern included in the input fingerprint image 651 is included at a length corresponding to the input fingerprint image 651 in a combined image 655 obtained by the fingerprint image preprocessing apparatus.

Figure 7:
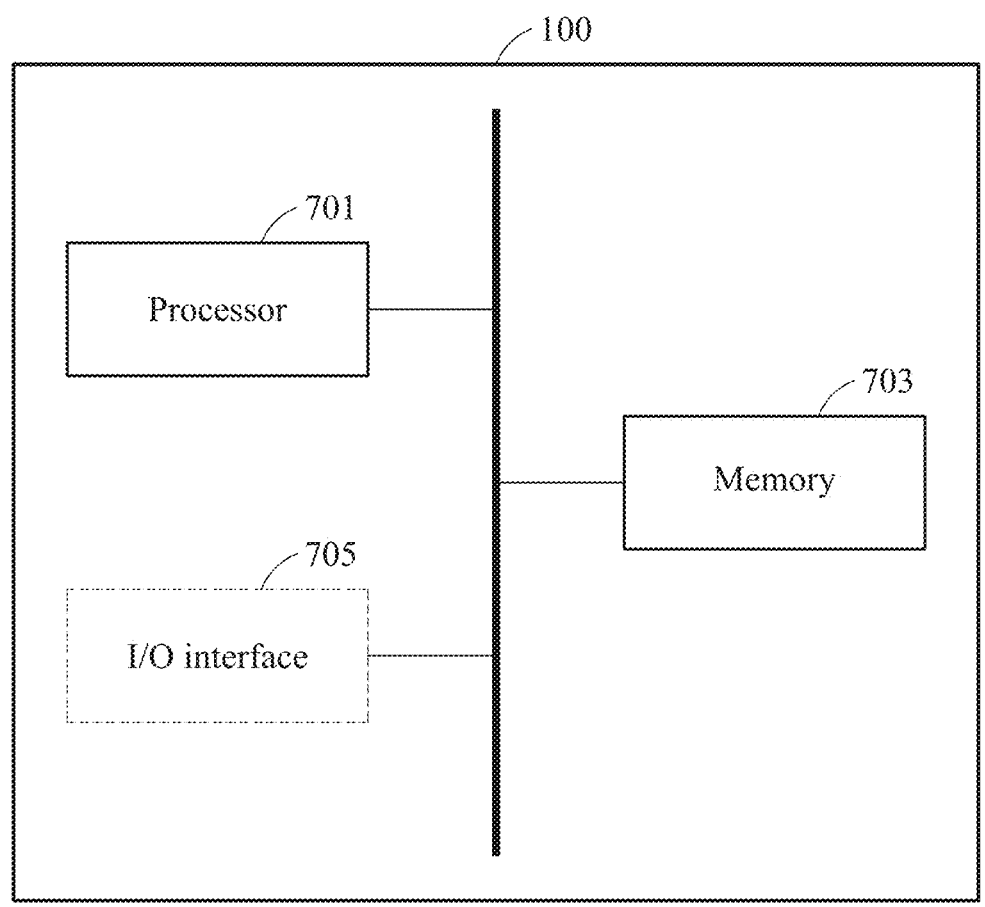
FIG. 7 is a diagram illustrating an example of a fingerprint image preprocessing apparatus according to an example embodiment.

FIG. 7 is a diagram illustrating an example of a fingerprint image preprocessing apparatus according to an example embodiment.

Referring to FIG. 7, a fingerprint image preprocessing apparatus 100 includes at least one processor 701 and a memory 703 configured to store therein an instruction to operate the processor 701. The fingerprint image preprocessing apparatus 100 may further include an input and output (I/O) interface 705.

The processor 701 may receive an input fingerprint image. The processor 701 may obtain a transformed fingerprint image by performing an STFT on the input fingerprint image. The processor 701 may compare the input fingerprint image and the transformed fingerprint image. The processor 701 may generate a combined image by combining the input fingerprint image and the transformed fingerprint image based on a result of the comparing.

The processor 701 may separate a magnitude and a phase from each of the input fingerprint image and the transformed fingerprint image. The processor 701 may apply, to each area of the combined image, a result of combining the magnitude and the phase of the input fingerprint image and the magnitude of the transformed fingerprint image, or apply the transformed fingerprint image, based on a result of the comparing.

For example, when a pixel value of a first pixel included in an area in the input fingerprint image is greater than a pixel value of a second pixel corresponding to a position of the first pixel in an area in the transformed fingerprint image, the processor 701 may allocate a first identifier to a corresponding position of the first pixel in the combined image. When the pixel value of the first pixel in the area in the input fingerprint image is less than the pixel value of the second pixel in the area in the transformed fingerprint image, the processor 701 may allocate a second identifier to the corresponding position of the first pixel in the combined image.

The processor 701 may apply, to the corresponding position of the first pixel in the combined image, a result of combining the input fingerprint image and the transformed fingerprint image based on the first identifier. The processor 701 may also apply, to the corresponding position of the first pixel in the combined image, the transformed fingerprint image based on the second identifier.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While example embodiments have been described with reference to the figures, it will be understood by those of ordinary skill in the art that various changes in form and details may be made therein without departing from the spirit and scope as defined by the following claims.

What is claimed is:

1. A fingerprint image preprocessing method comprising:
receiving an input fingerprint image;
performing a short-time Fourier transform (STFT) on the input fingerprint image to obtain a transformed fingerprint image;
comparing the input fingerprint image and the transformed fingerprint image; and
generating a combined image by combining the input fingerprint image and the transformed fingerprint image based on a result of the comparing,
wherein the generating of the combined image comprises:
separating a phase and a magnitude from each of the input fingerprint image and the transformed fingerprint image; and
applying a result of combining the phase and the magnitude of the input fingerprint image and the magnitude of the transformed fingerprint image to each area of the combined image, or applying the transformed fingerprint image to each area of the combined image.

2. The fingerprint image preprocessing method of claim 1, wherein the comparing comprises:
comparing a sensitivity of the input fingerprint image and a sensitivity of the transformed fingerprint image for each corresponding area.

3. The fingerprint image preprocessing method of claim 2, wherein the comparing further comprises:
setting a mask in each of the input fingerprint image and the transformed fingerprint image; and
comparing each of a plurality of pixels in an area in the input fingerprint image corresponding to the mask and each of a plurality of pixels in an area in the transformed fingerprint image corresponding to the mask.

4. The fingerprint image preprocessing method of claim 3, wherein the comparing of each of the plurality of pixels comprises:
comparing a pixel value of a pixel in the area in the input fingerprint image and a pixel value of a pixel in the area in the transformed fingerprint image.

5. The fingerprint image preprocessing method of claim 4, wherein the comparing of each of the plurality of pixels further comprises:
in response to a pixel value of a first pixel in the area in the input fingerprint image being greater than a pixel value of a second pixel corresponding to a position of the first pixel in the area in the transformed fingerprint image, allocating a first identifier to a corresponding position of the first pixel in the combined image; and
in response to the pixel value of the first pixel in the area in the input fingerprint image being less than the pixel value of the second pixel corresponding to the position of the first pixel in the area in the transformed fingerprint image, allocating a second identifier to the corresponding position of the first pixel in the combined image.

6. The fingerprint image preprocessing method of claim 2, wherein the generating of the combined image comprises:
in response to the sensitivity of the input fingerprint image being greater than the sensitivity of the transformed fingerprint image, combining the input fingerprint image and the transformed fingerprint image, and applying a result of the combining to generate the combined image.

7. The fingerprint image preprocessing method of claim 3, wherein the generating of the combined image comprises:
in response to a pixel value of a first pixel in the area in the input fingerprint image being greater than a pixel value of a second pixel corresponding to a position of the first pixel in the area in the transformed fingerprint image, applying, to a corresponding position of the first pixel in the combined image, a result of combining the input fingerprint image and the transformed fingerprint image.

8. The fingerprint image preprocessing method of claim 5, wherein the generating of the combined image comprises:
applying, to the corresponding position of the first pixel in the combined image, a result of combining the input fingerprint image and the transformed fingerprint image based on the first identifier; and
applying, to the corresponding position of the first pixel in the combined image, the transformed fingerprint image based on the second identifier.

9. A non-transitory computer-readable storage medium storing instructions that, when executed by a processor, cause the processor to perform the fingerprint image preprocessing method of claim 1.

10. A fingerprint image preprocessing apparatus comprising:
at least one processor; and
a memory configured to store an instruction to operate the processor,
wherein the processor is configured to:
receive an input fingerprint image;
perform a short-time Fourier transform (STFT) on the input fingerprint image to obtain a transformed fingerprint image;
compare the input fingerprint image and the transformed fingerprint image;
generate a combined image by combining the input fingerprint image and the transformed fingerprint image based on a result of the comparing;
separate a phase and a magnitude from each of the input fingerprint image and the transformed fingerprint image; and
apply an image resulting from of combining the phase and the magnitude of the input fingerprint image and the magnitude of the transformed fingerprint image to each area of the combined image, or apply the transformed fingerprint image to each area of the combined image.

11. The fingerprint image preprocessing apparatus of claim 10, wherein the processor is further configured to:
set a mask in each of the input fingerprint image and the transformed fingerprint image; and
compare each of a plurality of pixels in an area in the input fingerprint image corresponding to the mask and each of a plurality of pixels in an area in the transformed fingerprint image corresponding to the mask.

12. The fingerprint image preprocessing apparatus of claim 11, wherein the processor is further configured to:

compare a pixel value of a pixel in the area in the input fingerprint image and a pixel value of a pixel in the area in the transformed fingerprint image.

13. The fingerprint image preprocessing apparatus of claim 12, wherein the processor is further configured to:
   in response to a pixel value of a first pixel in an area in the input fingerprint image being greater than a pixel value of a second pixel corresponding to a position of the first pixel in an area in the transformed fingerprint image, allocate a first identifier to a corresponding position of the first pixel in the combined image; and
   in response to the pixel value of the first pixel in the area in the input fingerprint image being less than the pixel value of the second pixel corresponding to the position of the first pixel in the area in the transformed fingerprint image, allocate a second identifier to the corresponding position of the first pixel in the combined image.

14. The fingerprint image preprocessing apparatus of claim 11, wherein the processor is further configured to:
   apply, to a corresponding position of a first pixel in the combined image, a result of combining the input fingerprint image and the transformed fingerprint image based on a first identifier; and
   apply, to a corresponding position of the first pixel in the combined image, the transformed fingerprint image based on a second identifier.

\* \* \* \* \*